United States Patent [19]

Perrine

[11] 4,398,553
[45] Aug. 16, 1983

[54] TEE VALVE ASSEMBLY
[75] Inventor: Neill D. Perrine, Jackson, Mich.
[73] Assignee: Aeroquip Corporation, Jackson, Mich.
[21] Appl. No.: 325,231
[22] Filed: Nov. 27, 1981
[51] Int. Cl.³ .......................................... F16K 13/04
[52] U.S. Cl. ................................... 137/68 R; 251/74; 251/144
[58] Field of Search ................ 137/68 R; 251/74, 144

[56] References Cited
U.S. PATENT DOCUMENTS

| | | | |
|---|---|---|---|
| 3,145,968 | 8/1964 | Marx | 251/144 |
| 3,802,459 | 4/1974 | Geraudie | 251/74 X |
| 4,056,117 | 11/1977 | Deeks | 251/144 X |
| 4,310,145 | 1/1982 | Wempe | 251/144 |

Primary Examiner—Harold W. Weakley
Attorney, Agent, or Firm—Beaman & Beaman

[57] ABSTRACT

The invention pertains to a crashworthy valved fitting for interconnecting a tank, such as a fuel tank, with a fluid line wherein valve structure is manually operated, and fluid pressure assists in maintaining the valve in a closed condition. An extension defined upon a Tee fitting body, which may be separated therefrom at a frangible location, is circumscribed by a mounting surface and extends into a tank opening, and the extension side wall includes a plurality of orifices whereby communication between the tank and the fitting is achieved. A displaceable valve selectively seals the extension orifices, and a manually displaceable valve actuator incorporates locking means for maintaining the valve in the open position, and permitting releasing of the valve of for movement to a closed position. Pressure faces defined upon the valve of differential areas subjected to the pressurized medium produces a force for assisting to maintain the valve in the closed condition.

8 Claims, 3 Drawing Figures

TEE VALVE ASSEMBLY

BACKGROUND OF THE INVENTION

Valved fittings are often utilized in aircraft fueling systems which are of the crashworthy type wherein valve structure closes in the event that the fitting is subjected to high impact forces. Such fittings permit valves to automatically close in the vent of an aircraft crash to prevent fuel leakage, and fires.

It is an object of the invention to provide a valved Tee assembly fitting which permits fluid lines to communicate with a tank or reservoir, and wherein automatic closing of a valve occurs in the event of high impact forces being imposed upon the valve structure.

Another object of the invention is to provide a valved Tee assembly fitting for connecting the interior of a tank with a fuel line wherein valve structure controls the communication of the fitting with the tank, and internal fluid pressure within the fitting aids in maintaining the valve closed, and a manual operation is required to shift the valve to an open position.

An additional object of the invention is to provide a valve assembly fitting for interconnecting a tank and a fluid line wherein the valve is locked in the open position by a manual actuator, release of the manual actuator permits the valve to be closed by a spring action, and the fluid pressure within the fitting assists in maintaining the valve closed.

In the practice of the invention a Tee fitting has a body which includes axially aligned fluid line ports, and a transversely disposed extension adapted to be inserted into a tank. A mounting surface encircles the extension, and openings or orifices are defined in the extension side wall to establish selective communication between the interior of the fitting and the tank.

An annular cup-shaped valve is axially displaceable within the extension moveable between an open position which clears the side wall openings, and a closed position wherein the wall of the valve closes the openings. The valve includes oppositely disposed fluid faces of differential area wherein when the valve is closed, the fluid pressure within the fitting assists in maintaining the valve in the closed position.

Movement of the valve from the closed to the open position is usually produced through a manual actuator which includes a plunger slidably supported upon the fitting body. The plunger includes a plurality of ball detents selectively cooperating with a fixed locking recess defined upon the body, and a manually displaceable rod positions the ball detents between operative and inoperative conditions. The ball detents are released from their locking position by a manual pull upon the rod, while pushing the rod initially shifts the valve from the closed to the open position, and such movement aids in placing the ball detents in their locked condition upon the valve being fully opened.

The valve body is provided with a frangible portion intermediate the fluid line port portion and the extension, and the mounting surface for the valve body is disposed adjacent the extension whereby impact forces imposed upon the valve body will cause the line portion to separate from the extension. The valve actuator merely abuts the valve whereby fracture, and displacement of the line portion, imposes no damaging forces upon the valve, and the valve is permitted to automatically close under the biasing force imposed thereon by a compression spring.

The components of the Tee valve assembly may be readily manufactured, and the automatic and manual operation of the valve is highly dependable.

BRIEF DESCRIPTION OF THE DRAWINGS

The above objects and advantages of the invention will be appreciated from the following description and accompanying drawings wherein.

DESCRIPTION OF THE PREFERRED EMBODIMENT

Figure 1:
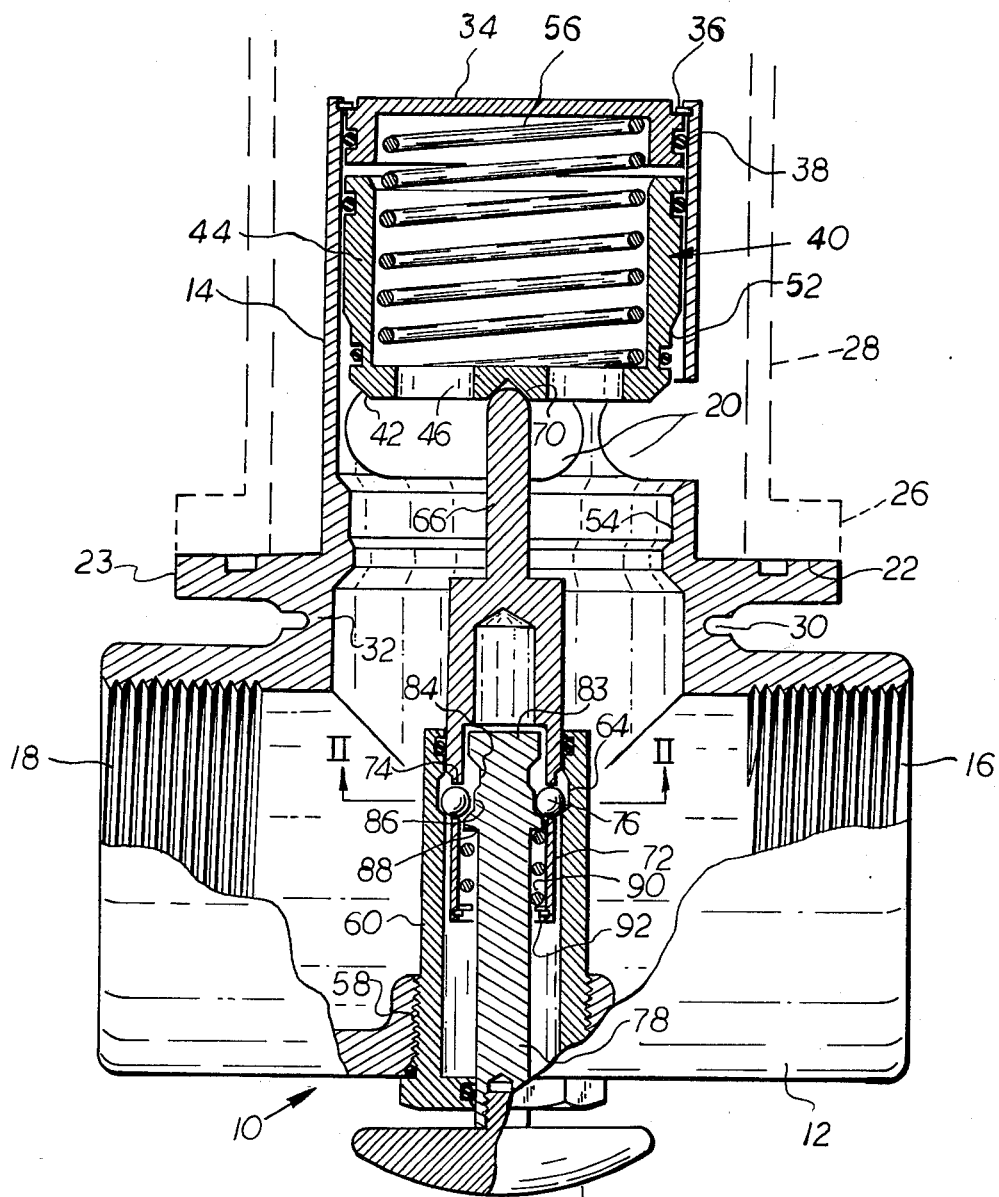
FIG. 1 is an elevational view, partially in diametrical section, illustrating a Tee valve assembly in accord with the invention, the valve being in the open position.

In the preferred construction the fitting assembly constitutes a Tee, although it will be appreciated that the concepts could be incorporated into an elbow, or other conventional conduit system component configuration. The fitting includes a body 10 having a line port portion 12, and an extension 14. The line port portion includes fluid line ports 16 and 18, which may be threaded, or provided with other conventional means for attaching a fluid line thereto, not shown, such as a fuel line for aircraft.

The extension 14 is of a cylindrical configuration having an axis perpendicularly disposed to the axis of the ports 16 and 18 and the extension includes a side wall in which a plurality of openings or orifices 20 of elongated configuration are defined. An annular flat mounting surface 22 is defined upon the fitting body flange 23 encircling the extension 14, and is provided with a sealing ring groove 24 and holes, not shown, defined in the mounting flange permit the mounting flange to be mounted upon a tank flange 26, FIG. 1, in a sealed relationship by bolts extending through the body flange 23, in the known manner. As represented in dotted lines in FIG. 1 the fuel tank in which the fitting is mounted includes a neck 28 which receives the extension 14 and the neck terminates at the flange 26.

The body 10 is provided with an annular indentation 30 between the portions 12 and 14 to define a weakened frangible annular wall portion 32 whereby, in the event of a crash, the portion 12 may separate from the extension 14 upon fracture of portion 32.

The innermost end of the extension 14 is sealed by a cap 34 which is held in position by a snap ring 36 located within an annular groove in the extension side wall. A seal ring 38 seals the cap 34 with respect to the side wall.

The valve 40 is of a cup configuration and includes a base 42 and an annular cylindrical skirt 44. The base 42 is provided with a plurality of orifices 46 wherein fluid pressure within the fitting will be exposed to both sides of the valve base. The valve includes a seal ring 48 which engages the cylindrical side wall of the extension 14, and a seal ring 50 of a smaller outer diameter than seal ring 48 intersects the valve reduced diameter 52 which nests within the reduced diameter side wall portion 54 when the valve is in the closed position, as shown in FIG. 3.

Figure 3:
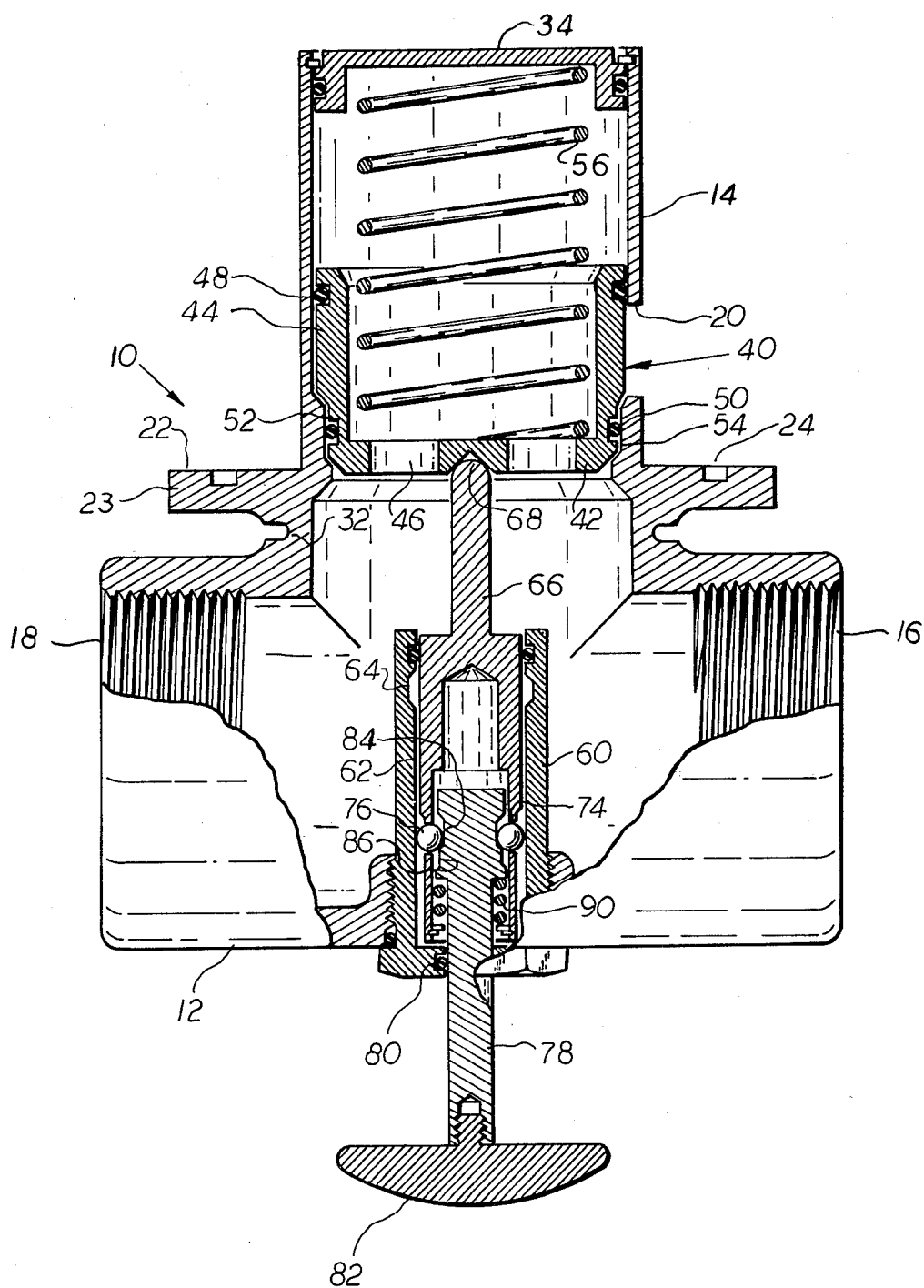
FIG. 3 is an elevational, partially sectioned view similar to FIG. 1 illustrating the relationship of the components when the valve is in the closed condition.

The presence of the reduced diameter portion 54, and the seal ring 50, produces an effective pressure face upon the valve 40, when the valve is in the closed position, of lesser area on the underside of the valve as compared to the valve upperside as it appears in FIGS. 1 and 3. The pressure face defined upon the valve 40 at the upper end of the valve, is of a greater area in view of the greater diameter of the extension side wall and valve skirt 44, and this differential in areas as defined upon the valve produce a pressure assisted closing force on the valve once the valve is closed.

A compression spring 56 is interposed between the cap 34 and the valve 40, tending to bias the valve to the downward or closed position of FIG. 3.

Positioning of the valve 40 is by means of manually operated actuator and locking apparatus. The valve portion 12 is provided with a threaded bore 58 into which the tubular retainer 60 is threaded as to be coaxial with the axis of the valve. The retainer 60 is provided with a cylindrical inner surface 62 into which the annular recess 64 is defined near the upper end thereof.

A plunger 66, at its upper end, is provided with a nose 68 which abuts against the valve base 42 at the recess 70, and the lower portion of the plunger is of a hollow tubular configuration to form a skirt 72 which is sealingly and slidably received within the retainer 60. A seal ring seals the plunger 66 with respect to the retainer.

Figure 2:
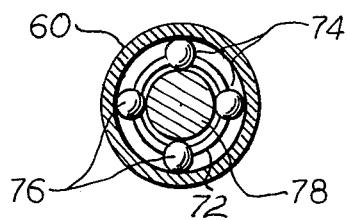
FIG. 2 is an enlarged, detail, sectional view taken through the valve actuator ball detents along Section II—II of FIG. 1.

The skirt 72 of the plunger is provided with four openings 74 in which ball detents 76 are loosely received, FIG. 2, and the ball detents are selectively alignable with, and removable from, the retainer recess 64 as described below.

A rod 78 is slidably received within the retainer 60, and is sealed with respect thereto by seal ring 80. The rod 78 includes a button or handle 82 at its outer end, and at its inner end is received within the plunger skirt and includes an enlarged head 83 in which the annular recess 84 is defined. Adjacent the annular recess 84 is a cylindrical detent positioning surface 86, and an enlarged stop lip 88, and compression spring 90 is interposed between the rod head 83 and the lower end of the plunger 66 which includes a snap ring 92 defining the lower anchor surface for the spring. Thus, it will be appreciated that the spring 90 tends to bias the lower end of the plunger 66 away from the rod head 83.

In its normal operating condition the components of the Tee valve assembly will be as shown in FIG. 1. The rod 78 will be in its retracted position wherein the cylindrical surface 86 will be in alignment with the ball detents 76 forcing the ball detents radially outward into the recess 64. In this manner the plunger 66 will be locked in its extended position which holds the valve 40 out of alignment with the extension side wall openings 20 permitting communication between the tank and the interior of the fitting body 10. The spring 90 will maintain the rod 78 in its retracted position, and with the components as shown in FIG. 1 fluid flow between the tank neck 28 and the fuel lines affixed to the ports 16 and 18 takes place.

If it is desired to manually close the valve 40 the operator grasps the button 82 and pulls on the rod 78. This action compresses the spring 90 permitting the recess 84 to radially align with the ball detents 76. Upon such alignment occurring the oblique lower surface of the retainer recess 64, and the downward force on the plunger 66 by spring 56, will cause the detents 76 to be received within the recess 84, and released from the recess 64. Thereupon, the plunger 66 is moved downwardly, FIG. 1, and the rod, plunger and valve 40 will simultaneously move downwardly under the influence of the spring 56, and the pull exerted on the rod 78. Such movement of these components continues until the lower end of the plunger 66 engages the lower end of the retainer 60, and at this time the valve 40 will be seated as shown in FIG. 3.

With the valve 40 in the closed position of FIG. 3 the valve skirt 44 will be sealing the extension openings 20 preventing communicating between the tank neck 28 and the interior of the fitting body 10. Fluid pressure within the fitting acts upon both sides of the surfaces of the valve 40, and due to the fact that the pressure surfaces "above" the base 42 are of greater area than the pressure surfaces "below" the valve base the fluid pressure within the fitting will assist in maintaining the valve 40 in the closed condition.

To open the valve 40, the operator merely pushes upon the rod button 82, and this force causes the rod 78 to move into retainer 60, which lifts plunger 66 through the ball detents which will ride against surface 62, raising the valve. The inward movement of the rod 78 continues until the ball detents 76 align with annular recess 64, and at such time the detents move outwardly into the recess due to the radial forces imposed thereon by the lower oblique surface of the recess 84, and the ball detents will then be aligned with the rod abutment surface 86, as shown in FIG. 1 and locking the plunger 66.

In the event of a crash, or excessive forces being applied to the fitting body 10, the body portions 12 and 14 will separate upon fracture occurring at frangible portion 32. In that the plunger 66 only contacts the valve 40 by an abutment connection, the removal of the portion 12 from the extension 14 will not impose any damaging forces upon the valve 40, and the removal of the plunger merely permits the valve 40 to be quickly shifted to its closed position of FIG. 3 under the influence of the compression spring 56. Thus, leakage from the tank is automatically prevented in the event of a crash.

It is to be appreciated that various modifications to the inventive concepts may be apparent to those skilled in the art without departing from the spirit and scope of the invention.

I claim:

1. A valve for interconnecting a tank with a fluid line wherein the tank includes an access opening encompassed by a mounting surface, in combination, a hollow body having a fluid line port having a longitudinal axis, a tubular extension defined upon said body having an axis transverse to said port axis, a mounting surface defined on said body about said extension whereby said extension is receivable within the tank opening and said body mounting surface engages the tank mounting surface, said extension including a side wall, an opening defined in said side wall, a valve axially movably within said extension between a closed position sealing said opening with respect to the interior of said extension and an open position permitting flow through said opening, first and second pressure faces defined upon said valve both exposed to fluid pressure within said body wherein pressure upon said first face when said valve is in the closed position forces said valve toward said closed position and pressure upon said second face forces said valve toward said open position, said first face having a greater area than said second face whereby the greater pressure on said valve is in the direction toward said closed position, a manually operated valve actuator mounted upon said body operatively connected to said valve controlling movement of said valve between said open and closed positions, and locking means associated with said actuator selectively locking said actuator in a position to maintain said valve in said open position.

2. In a valve as in claim 1, a compression spring within said extension biasing said valve toward said closed position.

3. In a valve as in claim 2, a frangible portion defined upon said body adjacent said mounting surface whereby said mounting surface and extension may be separated from the portion of said body defining said fluid line port upon predetermined impact forces being imposed upon said body, said valve actuator being releasably associated with said valve permitting said valve to close upon fracture of said frangible portion.

4. In a valve as in claim 1, said valve comprising a cup-shaped member having a cylindrical side wall and a base, an orifice defined in said base to equalize the pressure within said valve and said body, and a compression spring within said valve biasing said valve toward said closed position.

5. In a valve as in claim 4, said base defining said second face, said second face being disposed toward said valve actuator.

6. In a valve as in claim 1, said valve actuator including a plunger axially aligned with and engaging said valve and mounted upon said body for movement between an extended position moving said valve to said open position and a retracted position permitting said valve to move to said closed position, said locking means engaging said plunger and selectively maintaining said plunger in said extended position.

7. In a valve as in claim 6, wherein said locking means comprises a manually operated rod mounted on said body coaxial with said valve and axially displaceable between plunger locking and plunger displacing positions, said rod locking said plunger in said extended position at said locking position and connected to said plunger when said plunger is in said retracted position whereby said rod may displace said plunger from said retracted position to said extended position.

8. In a valve as in claim 7, said plunger including a tubular portion having a side wall and an open end, said rod being slidably received within said tubular portion through said open end, a plurality of detents mounted within said plunger tubular portion side wall radially displaceable between an extended position engaging a recess fixedly defined on said body and a retracted position out of engagement with said recess, and a cam surface defined upon said rod engaging said detents selectively shifting said detents between said extended and retracted positions, said detents aligning with said recess only at said valve open position.

* * * * *